United States Patent Office 2,951,629
Patented Sept. 6, 1960

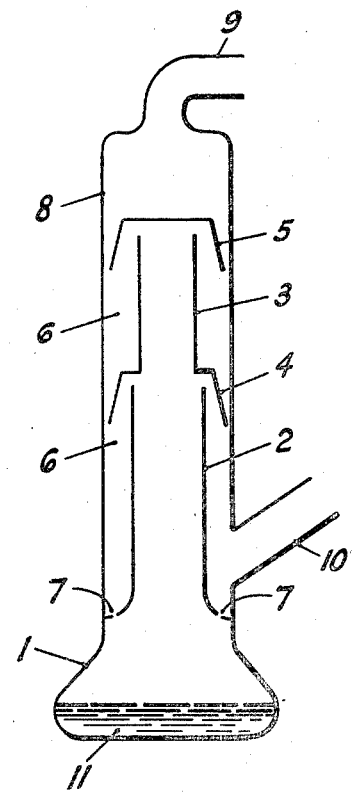

2,951,629

SILICATE DIFFUSION PUMP FLUIDS

Jed P. Shepardson, Midland, Mich., assignor to Dow Corning Corporation, Midland, Mich., a corporation of Michigan Filed July 21, 1958, Ser. No. 749,595

13 Claims. (Cl. 230—101)

This invention relates to the use of certain silicate fluids in diffusion-type vacuum pumps.

The use of organopolysiloxanes as diffusion pump fluids has been known since approximately 1945. These fluids have the advantage over organic diffusion pump fluids in that diffusion pumps employing the silicones to produce ultimate pressures of $10^{-7}$ mm. Hg can be stopped and the vacuum broken without a time interval for cooling. Such treatment of pumps employing organic diffusion pump fluids decomposes the fluids. Tetraorganosilanes have also been used as diffusion pump fluids. These, too, have shown the same sort of thermal stability as the organopolysiloxanes. This thermal stability reduces the time lost in "downtime" necessary to preserve the organic fluids.

Applicant has found that silicate fluids will produce vacua down to $10^{-6}$ mm. Hg and at the same time show superior thermal stability over organic fluids for commercial use in diffusion pumps. In addition, the silicate fluids have an advantage over the previously-employed silicone fluids in that the silicates cost from ¼ to ⅒ as much as the silicones due to low cost of raw materials and ease of production and can therefore compete economically, both price-wise and performance-wise, with previously-employed organic diffusion pump fluids such as chlorinated biphenyls.

The object of this invention is to provide new organosilicon diffusion-type pump fluids which are more thermally stable than organic fluids and competitive therewith price-wise. Another object is to provide such new fluids which can be used in diffusion pumps to produce vacua down to $10^{-6}$ mm. Hg.

This invention relates to a method which consists of the removal of gas from a closed system by the entrainment of gases in a stream of vapors of certain organosilicon fluids having a boiling point of from 100 to 350° C. at 0.5 mm. Hg absolute pressure. Generically, these fluids are composed of units of the formula

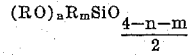

in which each R is a monovalent hydrocarbon radical free of aliphatic unsaturation or a halogenated aryl radical, each $n$ has a value of from 1 to 4 inclusive, each $m$ has a value of from 0 to 3 inclusive, and the sum of $m+n$ for any unit has a value of from 2 to 4 inclusive.

These fluids include both silanes and siloxanes. The silanes contain from 1 to 4 hydrocarbonoxy radicals per silicon atom. The silanes are covered by the above generic formula when the sum of $m+n$ is 4. Disiloxanes are made up of 2 of the above units for each of which the sum of $m+n$ is 3. Likewise, polysiloxanes are made up of units for some of which the sum of $m+n$ is 2 and for others of which the sum of $m+n$ is 3. This formula also includes cyclic polysiloxanes for the units of which the sum of $m+n$ is 2.

As stated above, R can be any monovalent hydrocarbon radical free of aliphatic unsaturation or any halogenated aryl radical. More specifically, R can be an alkyl radical such as methyl, ethyl, isopropyl, t-butyl, 2-ethylhexyl, dodecyl, octadecyl or the like; a cyclo aliphatic radical such as cyclopentyl or cyclohexyl; an aryl radical such as phenyl, xenyl or naphthyl; an alkaryl radical such as tolyl and xylyl or an aralkyl radical such as benzyl. R can also be any halogenated aryl radical such as 2,6 - dibromophenyl, 2,4,6 - trichlorophenyl, o-iodophenyl, 2,4-dibromonaphthyl, 1,1,1-trifluorotolyl, 6 - bromo - 1 - methylnaphthyl, 3,4,5,6 - tetrabromotolyl, p - chlorobenzyl or 5 - bromo - 2,4 - dimethylphenyl. The scope of the (OR) groups in commensurate with the scope of the R groups, the only limitations being that the resulting organosilicon compound must have first, at least one OR group per silicon and, second, a boiling point of from 100 to 350° C. at 0.5 mm. Hg.

Examples of the specific types of compositions which are within the scope of this invention include such configurations as:

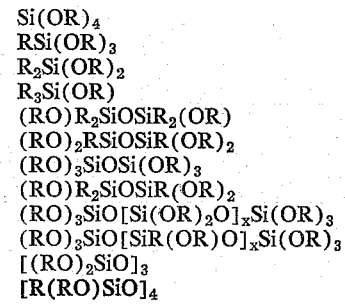

and the other similar polysiloxanes endblocked by other units shown above in place of the unit $(RO)_3SiO_{.5}$. This list is not complete but is included merely to illustrate the types of compositions operative in this invention.

Specific examples of operative materials within the scope of this invention are dimethyldiphenylorthosilicate, monomethyltriphenylorthosilicate, dimethyldi-o-cresylorthosilicate, monomethyltri-o-cresylorthosilicate, diethyldiphenylorthosilicate, monoethyltriphenylorthosilicate, diethyldi - o - cresylorthosilicate, monoisopropyltriphenylorthosilicate, triisobutylmonophenylorthosilicate, diisoamyldiphenylorthosilicate, monoisoamyltriphenylorthosilicate, tetra - 2 - ethylhexylorthosilicate, tetra - 2 - ethylbutylorthosilicate, tetra - 1,3 - dimethylbutylorthosilicate, di - undecyldi - octadecylorthosilicate, monoamyltriphenylorthosilicate, tetraphenylorthosilicate, tetracresylorthosilicate, hexa - 2 - ethylhexoxydisiloxane, hexa - 2 - ethylbutoxydisiloxane, diphenyldi - 2 - ethylhexoxysilane, monophenyltri - 2 - ethylhexoxysilane, diphenylmethylundecyloxysilane, monocyclohexyloxydi - 2 - ethylhexyloxymono - 2,4,6 - trichlorophenylsilane, 1,3,3 - tris - 2-ethylhexoxy - 1,1,3 - tri - 2 - ethylhexyldisiloxane, 1,1,1-tris - 2 - ethylbutoxy - 3 - 2,6 - dibromophenyloxy - 3,3-bis - 2,4 - dibromonaphthyldisiloxane, 1,1,1,3,5,5,5-hepta-2 - ethylbutoxy - 3 - cyclohexyltrisiloxane, octa - i-butoxytrisiloxane, monomethoxymono - 2 - ethylhexoxydinaphthylsilane and octaethoxytrisiloxane.

The preparation of the fluids employed in this invention is well known in the art. The orthosilicates can be prepared by direct synthesis of silicon tetrachloride and the appropriate hydroxyl-containing hydrocarbons, e.g. an alcohol or phenol, producing a family of products which can be separated by fractionation. The orthosilicates can also be prepared by transesterification of two orthosilicates. The preparation of the monoorganotrihydrocarbonoxysilanes, diorganodihydrocarbonoxysilanes, and triorganomonohydrocarbonoxysilanes is similar to the preparation of the orthosilicates except that monoorganotrichlorosilanes, diorganodichlorosilanes, and triorganomonochlorosilanes are substituted respectively for the silicon tetrachloride above. The preparation of the organochlorosilanes by Grignard synthesis is also well known.

The siloxane fluids employed in this invention can be prepared by the partial hydrolysis and condensation of the above-described monomers. This is accomplished by reacting orthosilicates and/or hydrocarbonoxysilanes with insufficient water to hydrolyze all the hydrocarbonoxy radicals. Similarly, partially hydrocarboxylated chlorosilanes can be hydrolyzed with the elimination of the silicon-bonded chlorine atoms in preference to the silicon-bonded hydrocarbonoxy radicals. The resulting hydrolyzates in either case condense with the elimination of water which can be easily removed by heating to temperatures of up to 100° C. or above. The product is a mixture of linear and cyclic siloxanes which can be separated by fractionation.

All the compositions of this invention are useful in diffusion-type pumps either for the production of high vacuum, i.e. $10^{-6}$ mm. Hg, or as booster pump fluids for vacua in the range of from $10^{-4}$ mm. Hg to $\frac{1}{10}$ of a mm. Hg.

The accompanying drawing is a diagrammatic sketch of a condensation pump. As is known, such pump comprises a boiler 1 containing a pumping fluid 11, one or more vapor jets such as those designated by the numerals 2 and 3, umbrellas 4 and 5 over the respective jets 2 and 3 for deflecting vapors downward into a condensation zone 6. The openings, e.g. ports or orifices, 7 near the base of said zone permit return of condensed liquid to the boiler 1. Condensation may be facilitated by cooling the outer wall 8 in usual ways, e.g. with air or water. The numeral 9 designates a gas line which may be connected to a system to be evacuated. Numeral 10 designates another gas line which is connected to a fore-pump, not shown, which is capable of producing a moderate vacuum, e.g. in the order of from 0.1 to 1 millimeter absolute pressure. The apparatus and its arrangement are conventional.

It is preferable that any single species of the fluids of this invention be used alone. However, mixtures of these fluids are operative where the boiling points of the fluids in any mixture are sufficiently close together that both fluids will vaporize and condense under operating conditions.

While it is impossible to specifically list all the possible silicates within the scope of this invention, any particular composition having a chemical structure within the limits set forth above can be easily tested merely by ascertaining its boiling point at 0.5 mm. Hg. Fluids boiling below 100° C. at this pressure are too volatile and therefore are difficult to condense at high vacuum operation. On the other hand, fluids boiling above 350° C. at this pressure are too non-volatile to efficiently produce a high vacuum. Furthermore, at this temperature the organosilicon fluids will have a tendency to rearrange or decompose.

The following examples are merely illustrative and are not intended to limit this invention which is properly delineated in the claims.

*Example 1*

The following silicate fluids were tested in a glass, single stage, self-purifying diffusion-type vacuum pump and performed satisfactorily producing the vacua shown below:

| Fluid | Boiling Point (° C.) at 0.5 mm. Hg | Ultimate Pressure (mm. Hg) | Boiler Temperature (° C.) |
|---|---|---|---|
| Tetra-2-ethylbutylorthosilicate | 142 | $1.1 \times 10^{-5}$ | 120 |
| Hexa-2-ethylbutoxydisiloxane | 188 | $2.1 \times 10^{-6}$ | 180 |
|  |  | $3.0 \times 10^{-6}$ | 185 |
| Tetra-2-ethylhexylorthosilicate | 183 | $2.1 \times 10^{-6}$ | 168 |
|  |  | $2.8 \times 10^{-6}$ | 170 |
|  |  | $3.0 \times 10^{-6}$ | 169 |
| Hexa-2-ethylhexoxydisiloxane | 248 | $3.4 \times 10^{-6}$ | 233 |
| Monopentyltriphenylorthosilicate | 178 | $5.6 \times 10^{-6}$ | 182 |
| Diphenyldi-2-ethylhexoxysilane | 177 | $3.3 \times 10^{-6}$ | 174 |
|  |  | $2.5 \times 10^{-6}$ | 178 |
|  |  | $2.1 \times 10^{-6}$ | 173 |
| Monophenyltri-2-ethylhexoxysilane | 176 | $3.7 \times 10^{-6}$ | 164 |
|  |  | $2.6 \times 10^{-6}$ | 162 |

*Example 2*

When the following silicate fluids having boiling points between 100 and 350° C. at 0.5 mm. Hg are employed as diffusion pump fluids, ultimate absolute pressures of from $10^{-4}$ to $10^{-6}$ mm. Hg are attained.

Tetraphenylorthosilicate
1,3,3-tris-2-ethylhexoxy-1,1,3-tri-2-ethylhexyldisiloxane
Mono - 2,4,6 - trichlorophenoxymono - 2,6 - dibromophenylphenylmethylsilane
Octa-isobutoxycyclotetrasiloxane That which is claimed is:

1. In a method wherein a system is evacuated by means of a diffusion-type vacuum pump, the step of entraining gas in a stream of vapors of an organosilicon fluid having a boiling point of from 100 to 350° C. at 0.5 mm. Hg absolute pressure and composed of units of the formula $$(RO)_n R_m SiO_{\frac{4-m-n}{2}}$$

in which each R is selected from the group consisting of monovalent hydrocarbon radicals free of aliphatic unsaturation and halogenated aryl radicals, each $n$ has a value of from 1 to 4 inclusive, each $m$ has a value of from 0 to 3 inclusive and the sum of $m$ and $n$ for any unit has a value of from 2 to 4 inclusive.

2. The method of claim 1 in which the sum of $m$ and $n$ has a value of 4.

3. The method of claim 1 in which the sum of $m$ and $n$ has a value of 3.

4. The method of claim 1 in which the sum of $m$ and $n$ has a value of 2.

5. The method of claim 1 in which the organosilicon fluid is a silane of the formula $(R'O)_4 Si$ in which each $R'$ is a monovalent hydrocarbon radical free of aliphatic unsaturation.

6. The method of claim 1 in which the organosilicon fluid is a silane of the formula $(R'O)_3 SiR'$ in which each $R'$ is a monovalent hydrocarbon radical free of aliphatic unsaturation.

7. The method of claim 1 in which the organosilicon fluid is a silane of the formula $(R'O)_2 SiR'_2$ in which each $R'$ is a monovalent hydrocarbon radical free of aliphatic unsaturation.

8. The method of claim 1 in which the organosilicon fluid is a disiloxane of the formula $(R'O)_3 SiOSi(OR')_3$ in which each $R'$ is a monovalent hydrocarbon radical free of aliphatic unsaturation.

9. The method of claim 1 in which the organosilicon fluid is $$[CH_3(CH_2)_3 \overset{\overset{\displaystyle C_2H_5}{|}}{C}HCH_2O]_4 Si$$

10. The method of claim 1 in which the organosilicon fluid is $$[CH_3(CH_2)_3\overset{C_2H_5}{\underset{|}{C}}HCH_2O]_3SiC_6H_5$$

11. The method of claim 1 in which the organosilicon fluid is $$[CH_3(CH_2)_2\overset{C_2H_5}{\underset{|}{C}}HCH_2O]_2Si(C_6H_5)_2$$

12. The method of claim 1 in which the organosilicon fluid is $$\{[CH_3CH_2)_2CHCH_2O]_3Si\}_2O$$

13. The method of claim 1 in which the organosilicon fluid is $$\{[CH_3(CH_2)_2\overset{C_2H_5}{\underset{|}{C}}HCH_2O]_3Si\}_2O$$

References Cited in the file of this patent
UNITED STATES PATENTS

| | | |
|---|---|---|
| 2,469,889 | Wilcock et al. | May 10, 1949 |
| 2,530,356 | Hunter | Nov. 14, 1950 |